(12) United States Patent
Huo et al.

(10) Patent No.: US 11,169,851 B2
(45) Date of Patent: Nov. 9, 2021

(54) RUNNING CONTROL METHOD, RESOURCE SHARING APPARATUS, AND COMPUTER-READABLE STORAGE MEDIUM

(71) Applicants: GD MIDEA AIR-CONDITIONING EQUIPMENT CO., LTD., Foshan (CN); MIDEA GROUP CO., LTD., Foshan (CN)

(72) Inventors: Weiming Huo, Foshan (CN); Jingchun Liu, Foshan (CN); Tianyu Zhang, Foshan (CN); Jin Huang, Foshan (CN)

(73) Assignees: GD MIDEA AIR-CONDITIONING EQUIPMENT CO., LTD., Foshan (CN); MIDEA GROUP CO., LTD., Foshan (CN)

(*) Notice: Subject to any disclaimer, the term of this patent is extended or adjusted under 35 U.S.C. 154(b) by 112 days.

(21) Appl. No.: 16/831,038

(22) Filed: Mar. 26, 2020

(65) Prior Publication Data
US 2020/0225626 A1 Jul. 16, 2020

Related U.S. Application Data

(63) Continuation of application No. PCT/CN2018/080756, filed on Mar. 28, 2018.

(30) Foreign Application Priority Data

Sep. 30, 2017 (CN) .......................... 201710945181.9

(51) Int. Cl.
*G05D 23/00* (2006.01)
*G06F 9/50* (2006.01)
(Continued)

(52) U.S. Cl.
CPC ......... *G06F 9/5016* (2013.01); *G05B 19/042* (2013.01); *G06F 9/455* (2013.01);
(Continued)

(58) Field of Classification Search
CPC ...... G06F 9/455; G06F 3/0631; G06F 9/5027; G06F 9/5016; H04L 12/403;
(Continued)

(56) References Cited

U.S. PATENT DOCUMENTS

| 6,853,291 B1* | 2/2005 | Aisa | H02J 13/0086 340/3.3 |
| 2005/0262216 A1* | 11/2005 | Kashiwabara | H04L 12/403 709/208 |

(Continued)

FOREIGN PATENT DOCUMENTS

| CN | 1701570 A | 11/2005 |
| CN | 101441470 A | 5/2009 |

(Continued)

OTHER PUBLICATIONS

World Intellectual Property Organization (WIPO) International Search Report for PCT/CN2018/080756 dated Jun. 28, 2018 5 Pages.
(Continued)

*Primary Examiner* — Tuan A Vu
(74) *Attorney, Agent, or Firm* — Anova Law Group, PLLC (57) ABSTRACT

A running control method includes determining a remaining running space of a first household appliance, receiving a remaining running space sent by a second household appliance connected with the first household appliance in an Internet of Things, and determining one of the second household appliance and the first household appliance hav-
(Continued)

ing the remaining running space meeting a preset remaining running space condition as a control-side household appliance.

16 Claims, 3 Drawing Sheets

(51) Int. Cl.
  *G05B 19/042* (2006.01)
  *H04L 12/403* (2006.01)
  *H04L 29/08* (2006.01)
  *G06F 9/455* (2018.01)
  *G16Y 10/80* (2020.01)
  *G16Y 40/30* (2020.01)
  *G16Y 20/30* (2020.01)

(52) U.S. Cl.
  CPC .......... *G06F 9/5027* (2013.01); *H04L 12/403* (2013.01); *H04L 67/125* (2013.01); *G05B 2219/25168* (2013.01); *G05B 2219/2642* (2013.01); *G16Y 10/80* (2020.01); *G16Y 20/30* (2020.01); *G16Y 40/30* (2020.01)

(58) Field of Classification Search
  CPC .. H04L 67/125; H02J 13/0086; G05B 19/042; G05B 2219/25168; G05B 2219/2642; G16Y 10/80; G16Y 40/30; G16Y 20/30
  See application file for complete search history.

(56) References Cited

U.S. PATENT DOCUMENTS

| | | | | |
|---|---|---|---|---|
| 2015/0095789 A1* | 4/2015 | Hyde | .................... | H04L 67/125 715/738 |
| 2018/0060361 A1* | 3/2018 | Beveridge | ............... | G06F 9/455 |

FOREIGN PATENT DOCUMENTS

| | | |
|---|---|---|
| CN | 103997441 A | 8/2014 |
| CN | 105791065 A | 7/2016 |
| CN | 106369752 A | 2/2017 |
| CN | 106524403 A | 3/2017 |
| CN | 107807965 A | 3/2018 |

OTHER PUBLICATIONS

The State Intellectual Property Office of PRC (SIPO) The First Office Action For CN Application No. 201710945181.9 dated Dec. 30, 2019 20 Pages (Translation Included ).

The State Intellectual Property Office of PRC (SIPO) The Second Office Action For CN Application No. 201710945181.9 dated Apr. 2, 2020 17 Pages (Translation Included ).

Chinese Patent Office (SIPO) Search Report for 2017109451819 dated Sep. 30, 2017 6 Pages(Translation Included).

* cited by examiner

RUNNING CONTROL METHOD, RESOURCE SHARING APPARATUS, AND COMPUTER-READABLE STORAGE MEDIUM

CROSS-REFERENCE TO RELATED APPLICATIONS

This application is a continuation of PCT/CN2018/080756, filed on Mar. 28, 2018, which claims priority to Chinese Patent Application No. 201710945181.9, entitled "Running Control Method, Resource Sharing Apparatus and Computer-readable Storage Medium," filed with the Chinese Patent Office on Sep. 30, 2017, the entire contents of both of which are incorporated herein by reference.

FIELD

The disclosure relates to the technical field of Internet of Things, in particular to a running control method, a resource sharing apparatus for household appliances and a computer-readable storage medium.

BACKGROUND

In the related art, the experience of a user can be effectively improved when the Internet of Things is applied to intelligent homes, and a control-side device, for example, a communication device such as a router, a switch or a server, is usually provided in the Internet of Things, where the control-side device receives running parameters of household appliances associated with the Internet of Things and adjusts and controls the running state of the household appliances according to the running parameters, and the household appliances can only run as the controlled-side device.

For example, an infrared sensor is provided in a certain indoor room, the infrared sensor transmits a human body signal to a router when the human body signal is detected, a temperature control instruction is generated by the router and sent to an air conditioner, the air conditioner automatically runs according to the indoor environment temperature and the temperature control instruction, without complicated operations to be performed by a user.

However, the existing solution of control of the Internet of Things has many technical defects as follows:

(1) coordinated control of the household appliances in the Internet of Things cannot be implemented when the control-side device fails;

(2) additional arrangement of the control-side device improves the hardware layout costs of the Internet of Things; and (3) absence of the function of resource sharing for the household appliances of the Internet of Things adversely affects user experience.

SUMMARY

The disclosure is intended to solve at least one of the technical problems in the existing technologies or the related art.

To this end, it is an object of the disclosure to provide a running control method.

It is another object of the disclosure to provide a resource sharing apparatus for household appliances.

It is still another object of the disclosure to provide a computer-readable storage medium.

In order to achieve the above objects, according to an embodiment of a first aspect of the disclosure, a running control method is provided, the method comprising: receiving remaining running space sent by a second household appliance; determining remaining running space of a first household appliance; and determining, from the second household appliance and the first household appliance, the household appliance of which the remaining running space meets a preset remaining running space condition as a control-side household appliance.

According to the technical solution, by determining, from the second household appliance and the first household appliance, the household appliance of which the remaining running space meets a preset remaining running space condition as a control-side household appliance, the control-side household appliance can replace a communication device such as a router, a switch or a server, so that the hardware layout costs of the Internet of Things are reduced.

In some embodiments, the second appliance may be a plurality of appliances.

In any of the above technical solutions, optionally, the method further comprises: receiving a uniform resource locator (URL) of a second resource sent by the second household appliance; and determining a uniform resource locator of a first resource of the first household appliance, where the first resource and the second resource are the same resource, and the remaining running space of the control-side household appliance can access and load the corresponding first resource of the first household appliance or the second resource of the second household appliance according to the uniform resource locator.

In the technical solution, the uniform resource locator of the first resource of the first household appliance is determined by receiving the uniform resource locator of the second resource sent by the second household appliance, so that the control-side household appliance stores a uniform resource identifier (URI) of the first resource of the first household appliance and the URI of the second household appliance, and the control-side household appliance can access and load the corresponding resource through the URI, and furthermore, the household appliances within the Internet of Things can share and obtain resources, whereby the functional limits of the household appliances in the Internet of Things is broken, and the user experience can be greatly improved.

The resource includes device, information, functional components (such as an infrared sensor) of the device and running capability (such as image processing, face recognition capability and the like), and the URL is needed for the control-side appliance to access and load the resource.

For example, household appliances in the Internet of Things are an air conditioner, a refrigerator and an electric rice cooker, where the resource of the air conditioner comprises: providing a camera, and implementing the face recognition capability by acquiring images through the camera. If the refrigerator is determined to be the control-side household appliance in the Internet of Things according to the remaining running space, the refrigerator stores the URI of the resource of the air conditioner, and by accessing and loading the URL, the refrigerator controls the electric rice cooker to stop heating or to enter a heat preservation state after cooking is finished if it's determined through the URI that the user leaves the room when the electric rice cooker is controlled to be running by the refrigerator, so that the face recognition capability is shared among the household appliances in the Internet of Things.

In any of the above technical solutions, optionally, both the first household appliance and the second household appliance are provided with the first resource and the control-side household appliance is a device providing the first resource for other household appliances in the Internet of Things.

In the technical solution, because both the first household appliance and the second household appliance are provided with the first resource and the control-side household appliance is a device providing the first resource for other household appliances in the Internet of Things, the control-side household appliance can have a share of the first resource through the URI and can share the first resource with other household appliances in the Internet of Things, where the above-mentioned other household appliances in the Internet of Things are not limited to the first household appliance and the second household appliance.

In any of the above technical solutions, optionally, determining, from the second household appliance and the first household appliance, the household appliance of which the remaining running space meets a preset remaining running space condition as the control-side household appliance comprises specifically the steps of determining, from the second household appliance and the first household appliance, a plurality of target household appliances of which the remaining running space meets the preset remaining running space condition; sending identification information of the target household appliance and space occupied by the first resource of the first household appliance to the second household appliance; and determining the target household appliance as the control-side household appliance after receiving confirmation response signaling of the target household appliance.

In the technical solution, by determining a target household appliance according to the remaining running space of the second household appliance and the remaining running space of the first household appliance, the target household appliance can replace a communication device such as a router, a switch or a server, so that the hardware layout costs of the Internet of Things are reduced; furthermore, by sending the identification information of the target household appliance and space occupied by a process of the first household appliance to the second household appliance, it can be further determined whether the running capability of the control-side household appliance can support the coordinated control of the Internet of Things, and finally after the confirmation response signaling of the target household appliance is received, the target household appliance is determined to be the control-side household appliance, so that the coordinated running in the Internet of Things can be realized according to control instructions from the control-side household appliance.

Specifically, the first household appliance and at least a second household appliance can be used as the control-side household appliance, therefore, when the control-side household appliance fails in the running control process, since the failed household appliance does not need to report the remaining running space, a new control-side household appliance can be reselected by adopting the above arbitration logic, so that the possibility of the technical problem that the Internet of Things cannot be used due to the failure of the control-side electrical appliance is reduced.

In some embodiments, the remaining running space defined by the technical solution of the present disclosure depends on the running thread of each household appliance.

In any of the above technical solutions, optionally, the remaining running space comprises the remaining running space of a memory and/or remaining running space of a CPU.

In the technical solution, because the remaining running space comprises the remaining running space of the memory and/or the remaining running space of the CPU, the accuracy of the remaining running space for selecting the control-side household appliance can be increased, and particularly because the remaining running space of the memory and the remaining running space of the CPU are referenced to simultaneously, the determined control-side household appliance can meet the use requirement of CPU resource and the use requirement of memory resource, so that the program execution speed and the system smoothness of the coordinated control process of the Internet of Things are improved.

A CPU utilization rate is the CPU space resource occupied by a running program, indicating the speed for executing the program of the household appliance in a preset time period, a higher CPU utilization rate indicates more programs run by the household appliance in the preset time period, and vice versa.

For example, thread (process) A takes 10 ms, then thread (process) B takes 30 ms, and then 60 ms for idle follows; again thread (process) A takes 10 ms, thread (process) B take 30 ms, and then 60 ms for idle follows; and if this happens for a period of time, the occupancy for the period of time is 40%.

In any of the above technical solutions, optionally, determining a target household appliance according to the remaining running space of the second household appliance and the remaining running space of the first household appliance specifically comprises the steps of: determining whether the remaining running space of the memory of any household appliance is greater than a preset threshold value of the remaining running space of the memory; and determining the household appliance with a largest remaining running space of the memory as the target household appliance when it's determined that the remaining running space of the memory of any household appliance is greater than the preset threshold value of the remaining running space of the memory.

In the technical solution, the household appliance with the largest remaining running space of the memory is determined as the target household appliance when it's determined that the remaining running space of the memory of any household appliance is greater than the preset threshold value of the remaining running space of the memory, and because the running process of each household appliance occupies a large amount of memory space resource in the Internet of Things, a threshold value of the remaining running space of the memory can be set to ensure the running resource requirements of the Internet of Things, for example, the threshold value of the remaining running space of the memory is 1G, 2G, 4G, 8G or 16G, etc.

In any of the above technical solutions, optionally, determining a target household appliance according to the remaining running space of the second household appliance and the remaining running space of the first household appliance specifically comprises the additional step of: determining the household appliance with a largest remaining running space of the CPU as the target household appliance when it's determined that the remaining running space of the memory of any household appliance is less than or equal to the preset threshold value of the remaining running space of the memory.

In the technical solution, when it is determined that the remaining running space of the memory of any household appliance is less than or equal to the preset threshold value of the remaining running space of the memory, it's shown that the memory occupancy of the household appliance in the Internet of Things is high; therefore, it's needed to further combine the remaining running space of the CPU to determine the target household appliance.

In any of the above technical solutions, optionally, the method further comprises: reporting local hardware running parameters to the control-side household appliance after determining the target household appliance as the control-side household appliance; receiving control instructions fed back by the control-side household appliance in response to the hardware running parameters; and running for a preset period of time according to the control instructions.

In the technical solution, by reporting the local hardware running parameters to the control-side household appliance after determining the target household appliance as the control-side household appliance, the control-side household appliance can determine corresponding control instructions according to the hardware running parameters, where the control-side household appliance is one of the second household appliances.

In some embodiments, the hardware running parameters can be a fan rotating speed, a compressor frequency, an air outlet direction and the like of an air conditioner, and can be a cooking power, a cooking duration, a heat preservation time and the like of a cooking appliance.

In the technical solution of a second aspect of the disclosure, a running control method is provided, the method comprising: receiving identification information of a target household appliance sent by a first household appliance; determining whether the identification information of the target household appliance matches the local identification information; analyzing space occupied by the first resource of any first household appliance when it's determined that the identification information of the target household appliance matches the local identification information; calculating a difference between the remaining running space of the second household appliance and the space occupied by the first resource of all the first household appliances, and recording the difference as the remaining space of the memory of the second household appliance; calculating a difference between the remaining space of the memory and the reserved running space of the memory of the second household appliance, and recording the difference as the difference of the memory space of the second household appliance; determining whether the difference of the memory space is greater than or equal to a threshold value of the difference of the memory space; and generating a confirmation response signaling and sending to all the first household appliances when it's determined that the difference of the memory space is greater than or equal to the threshold value of the difference of the memory space.

In the technical solution, by analyzing space occupied by the first resource of any first household appliance when it's determined that the identification information of the target household appliance matches the local identification information, whether the local memory resource can support to control all the second household appliances when playing the role of the control-side household appliance is determined; the confirmation response signaling is generated and sent to all the first household appliances when it's determined that the difference of the memory space is greater than or equal to the threshold value of the difference of the memory space, and a rejection response information is generated and sent to all the first household appliances when it's determined that the difference of the memory space is less than the threshold value of the difference of the memory space, so as to instruct the household appliances in the Internet of Things to reselect the control-side household appliance, where the household appliance sending the rejection response information is excluded from the options for reselection.

In any of the above technical solutions, optionally, the Internet of Things comprises at least one of a Bluetooth communication network, a ZigBee communication network, a Wi-Fi communication network, a radio frequency communication network, and a mobile cellular communication network.

In the technical solution of a third aspect of the disclosure, a resource sharing apparatus of the household appliance is provided, the device comprising: a memory, a processor and a resource sharing program of household appliances, where the resource sharing program of the household appliances is stored on the memory and can run on the processor, and the resource sharing program of the household appliances implements the steps of the running control method according to any of the above technical solutions when executed by the processor.

In any of the above technical solutions, optionally, the household appliance is one of an electric rice cooker, a soybean milk maker, an electric pressure cooker, an electric kettle, a high speed blender, a refrigerator, an air conditioner, a computer, an audio device, a washing machine and a water heater.

In the technical solution of a fourth aspect of the disclosure, a computer-readable storage medium is provided, the computer-readable storage medium having stored thereon a computer program which, implements the steps of the running control method according to any one of the above technical solutions, when the computer program is executed.

Additional aspects and advantages of the disclosure will be set forth in the description which follows, and in part will be obvious from the description, or may be learned by implementing the disclosure.

BRIEF DESCRIPTION OF THE DRAWINGS

The foregoing and/or additional aspects and advantages of the disclosure will be apparent from and elucidated with reference to the embodiments described hereinafter and with reference to the accompanying drawings, in which.

DETAILED DESCRIPTION OF THE EMBODIMENTS

In order that the above objects, features and advantages of the disclosure be more clearly understood, the embodiments will be described in further detail with reference to the accompanying drawings and detailed implementations. It should be noted that the embodiments and features in the embodiments of the application may be combined with one another when there are no conflicts.

In the following description, numerous specific details are set forth in order to provide a thorough understanding of the disclosure, but the disclosure may be implemented in a manner other than those described herein, and therefore, the scope of the disclosure is not limited to the specific embodiments disclosed below.

Hereinafter, a running control method according to embodiments of the disclosure will be described in detail with reference to FIGS. 1 to 5.

Figure 1:
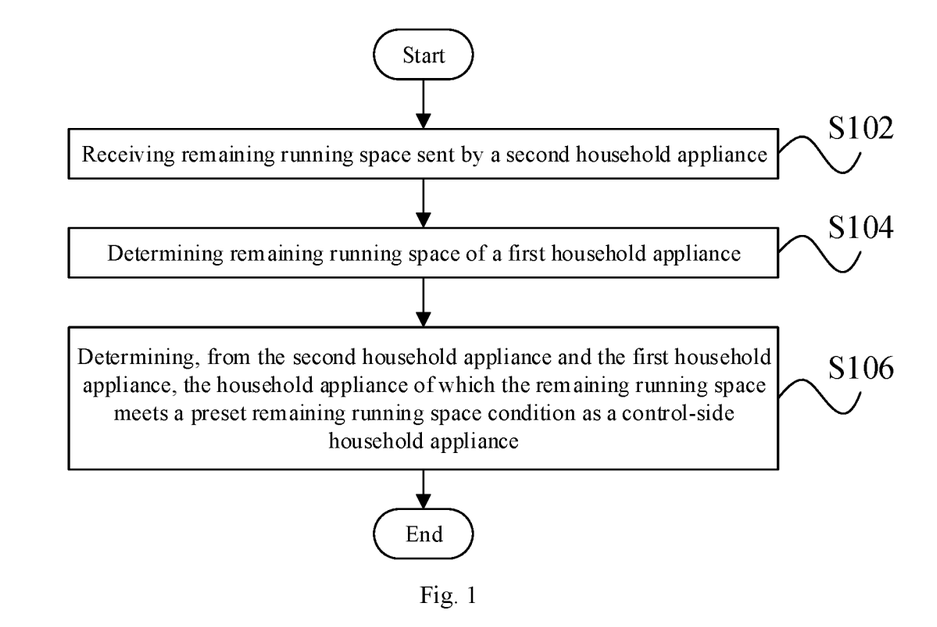
FIG. 1 shows a schematic flowchart of a running control method according to an embodiment of the disclosure.

FIG. 1 shows a schematic flowchart of a running control method according to an embodiment of the disclosure.

As shown in FIG. 1, the running control method according to an embodiment of the disclosure includes: S102, receiving remaining running space sent by a second household appliance; S104, determining remaining running space of a first household appliance; and S106, determining, from the second household appliance and the first household appliance, the household appliance of which the remaining running space meets a preset remaining running space condition as a control-side household appliance.

According to the technical solution, by determining, from the second household appliance and the first household appliance, the household appliance of which the remaining running space meets a preset remaining running space condition as a control-side household appliance, the control-side household appliance can replace a communication device such as a router, a switch or a server, so that the hardware layout costs of the Internet of Things are reduced.

In some embodiments, the second appliance may be a plurality of appliances.

In any of the above technical solutions, optionally, the method further includes: receiving a uniform resource locator of a second resource sent by the second household appliance; determining a uniform resource locator of a first resource of the first household appliance, where the first resource and the second resource are the same resource, and the remaining running space of the control-side household appliance can access and load the corresponding first resource of the first household appliance or the second resource of the second household appliance according to the uniform resource locator.

In the technical solution, the uniform resource locator of the first resource of the first household appliance is determined by receiving the uniform resource locator of the second resource sent by the second household appliance, so that the control-side household appliance stores a URI (Uniform Resource Identifier) of the first resource of the first household appliance and a URI of the second household appliance, and the control-side household appliance can access and load the corresponding resource through the URI, and furthermore, the household appliances within the Internet of Things can share and obtain resources, whereby the functional limits of the household appliances in the Internet of Things is broken, and the user experience can be greatly improved.

The resource includes device, information, functional components (such as an infrared sensor) of the device and running capability (such as image processing, face recognition capability and the like), and the URL is needed for the control-side appliance to access and load the resource.

For example, household appliances in the Internet of Things are an air conditioner, a refrigerator and an electric rice cooker, where the resource of the air conditioner includes: providing a camera, and implementing the face recognition capability by acquiring images through the camera. If the refrigerator is determined to be the control-side household appliance in the Internet of Things according to the remaining running space, the refrigerator stores the URI of the resource of the air conditioner, and by accessing and loading the URL, the refrigerator controls the electric rice cooker to stop heating or to enter a heat preservation state after cooking is finished if it's determined through the URI that the user leaves the room when the electric rice cooker is controlled to be running by the refrigerator, so that the face recognition capability is shared among the household appliances in the Internet of Things.

In any of the above technical solutions, optionally, both the first household appliance and the second household appliance are provided with first resource and the control-side household appliance is a device providing the first resource for other household appliances in the Internet of Things.

In the technical solution, because both the first household appliance and the second household appliance are provided with the first resource and the control-side household appliance is a device providing the first resource for other household appliances in the Internet of Things, the control-side household appliance can have a share of the first resource through the URI and can share the first resource with other household appliances in the Internet of Things, where the above-mentioned other household appliances in the Internet of Things are not limited to the first household appliance and the second household appliance.

In any of the above technical solutions, optionally, determining, from the second household appliance and the first household appliance, the household appliance of which the remaining running space meets a preset remaining running space condition as a control-side household appliance includes specifically the steps of determining, from the second household appliance and the first household appliance, a plurality of target household appliances of which the remaining running space meets the preset remaining running space condition; sending identification information of the target household appliance and space occupied by the first resource of the first household appliance to the second household appliance; and determining the target household appliance as the control-side household appliance after receiving confirmation response signaling of the target household appliance.

In the technical solution, by determining a target household appliance according to the remaining running space of the second household appliance and the remaining running space of the first household appliance, the target household appliance can replace a communication device such as a router, a switch or a server, so that the hardware layout costs of the Internet of Things are reduced; furthermore, by sending the identification information of the target household appliance and space occupied by a process of the first household appliance to the second household appliance, it can be further determined whether the running capability of the control-side household appliance can support the coordinated control of the Internet of Things, and finally after the confirmation response signaling of the target household appliance is received, the target household appliance is determined to be the control-side household appliance, so that the coordinated running in the Internet of Things can be realized according to control instructions from the control-side household appliance.

Specifically, the first household appliance and at least a second household appliance can be used as the control-side household appliance, therefore, when the control-side household appliance fails in the running control process, since the failed household appliance does not need to report the remaining running space, a new control-side household appliance can be reselected by adopting the above arbitration logic, so that the possibility of the technical problem that the Internet of Things cannot be used due to the failure of the control-side electrical appliance is reduced.

In some embodiments, the remaining running space defined by the technical solution of the present disclosure depends on the running thread of each household appliance.

In any of the above technical solutions, optionally, the remaining running space includes the remaining running space of a memory and/or remaining running space of a CPU.

In the technical solution, because the remaining running space includes the remaining running space of the memory and/or the remaining running space of the CPU, the accuracy of the remaining running space for selecting the control-side household appliance can be increased, and particularly because the remaining running space of the memory and the remaining running space of the CPU are referenced to simultaneously, the determined control-side household appliance can meet the use requirement of CPU resource and the use requirement of memory resource, so that the program execution speed and the system smoothness of the coordinated control process of the Internet of Things are improved.

A CPU utilization rate is the CPU space resource occupied by a running program, indicating the speed for executing the program of the household appliance in a preset time period, a higher CPU utilization rate indicates more programs run by the household appliance in the preset time period, and vice versa. For example, thread (process) A takes 10 ms, then thread (process) B takes 30 ms, and then 60 ms for idle follows; again thread (process) A takes 10 ms, thread (process) B take 30 ms, and then 60 ms for idle follows; and if this happens for a period of time, the occupancy for the period of time is 40%.

In any of the above technical solutions, optionally, determining a target household appliance according to the remaining running space of the second household appliance and the remaining running space of the first household appliance specifically includes the steps of: determining whether the remaining running space of the memory of any household appliance is greater than a preset threshold value of the remaining running space of the memory; and determining the household appliance with a largest remaining running space of the memory as the target household appliance when it's determined that the remaining running space of the memory of any household appliance is greater than the preset threshold value of the remaining running space of the memory.

In the technical solution, the household appliance with the largest remaining running space of the memory is determined as the target household appliance when it's determined that the remaining running space of the memory of any household appliance is greater than the preset threshold value of the remaining running space of the memory, and because the running process of each household appliance occupies a large amount of memory space resource in the Internet of Things, a threshold value of the remaining running space of the memory can be set to ensure the running resource requirements of the Internet of Things, for example, the threshold value of the remaining running space of the memory is 1G, 2G, 4G, 8G or 16G, etc.

In any of the above technical solutions, optionally, determining a target household appliance according to the remaining running space of the second household appliance and the remaining running space of the first household appliance specifically includes the additional step of: determining the household appliance with a largest remaining running space of the CPU as the target household appliance when it's determined that the remaining running space of the memory of any household appliance is less than or equal to the preset threshold value of the remaining running space of the memory.

In the technical solution, when it is determined that the remaining running space of the memory of any household appliance is less than or equal to the preset threshold value of the remaining running space of the memory, it's shown that the memory occupancy of the household appliance in the Internet of Things is high; therefore, it's needed to further combine the remaining running space of the CPU to determine the target household appliance.

In any of the above technical solutions, optionally, the method further includes: reporting local hardware running parameters to the control-side household appliance after determining the target household appliance as the control-side household appliance; receiving control instructions fed back by the control-side household appliance in response to the hardware running parameters; and running for a preset period of time according to the control instructions.

In the technical solution, by reporting the local hardware running parameters to the control-side household appliance after determining the target household appliance as the control-side household appliance, the control-side household appliance can determine corresponding control instructions according to the hardware running parameters, where the control-side household appliance is one of the second household appliances.

In some embodiments, the hardware running parameters can be a fan rotating speed, a compressor frequency, an air outlet direction and the like of an air conditioner, and can be a cooking power, a cooking duration, a heat preservation time and the like of a cooking appliance.

A person skilled in the art can understand that the running control method shown in FIG. 1 has a corresponding running control device, including: a communication device, used for receiving the remaining running space sent by the second household appliance; and a determination device, used for determining the remaining running space of the first household appliance; and the determination device is further used for determining, from the second household appliance and the first household appliance, the household appliance of which the remaining running space meets the preset remaining running space condition as the control-side household appliance.

According to the technical solution, by determining, from the second household appliance and the first household appliance, the household appliance of which the remaining running space meets a preset remaining running space condition as a control-side household appliance, the control-side household appliance can replace a communication device such as a router, a switch or a server, so that the hardware layout costs of the Internet of Things are reduced.

In some embodiments, the second appliance may be a plurality of appliances.

In any of the above technical solutions, optionally, the communication device is further used for: receiving a uniform resource locator of a second resource sent by the second household appliance; the determination device is further used for: determining a uniform resource locator of a first resource of the first household appliance, where the first resource and the second resource are the same resource, and the remaining running space of the control-side household appliance can access and load the corresponding first resource of the first household appliance or the second resource of the second household appliance according to the uniform resource locator.

In the technical solution, the uniform resource locator of the first resource of the first household appliance is determined by receiving the uniform resource locator of the second resource sent by the second household appliance, so that the control-side household appliance stores a URI (Uniform Resource Identifier) of the first resource of the first household appliance and a URI of the second household appliance, and the control-side household appliance can access and load the corresponding resource through the URI, and furthermore, the household appliances within the Internet of Things can share and obtain resources, whereby the functional limits of the household appliances in the Internet of Things is broken, and the user experience can be greatly improved.

The resource includes device, information, functional components (such as an infrared sensor) of the device and running capability (such as image processing, face recognition capability and the like), and the URL is needed for the control-side appliance to access and load the resource.

For example, household appliances in the Internet of Things are an air conditioner, a refrigerator and an electric rice cooker, where the resource of the air conditioner includes: providing a camera, and implementing the face recognition capability by acquiring images through the camera. If the refrigerator is determined to be the control-side household appliance in the Internet of Things according to the remaining running space, the refrigerator stores the URI of the resource of the air conditioner, and by accessing and loading the URL, the refrigerator controls the electric rice cooker to stop heating or to enter a heat preservation state after cooking is finished if it's determined through the URI that the user leaves the room when the electric rice cooker is controlled to be running by the refrigerator, so that the face recognition capability is shared among the household appliances in the Internet of Things.

In any of the above technical solutions, optionally, both the first household appliance and the second household appliance are provided with first resource and the control-side household appliance is a device providing the first resource for other household appliances in the Internet of Things.

In the technical solution, because both the first household appliance and the second household appliance are provided with the first resource and the control-side household appliance is a device providing the first resource for other household appliances in the Internet of Things, the control-side household appliance can have a share of the first resource through the URI and can share the first resource with other household appliances in the Internet of Things, where the above-mentioned other household appliances in the Internet of Things are not limited to the first household appliance and the second household appliance.

In any of the above technical solutions, optionally, the determination device is further used for: determining, from the second household appliance and the first household appliance, a plurality of target household appliances of which the remaining running space meets the preset remaining running space condition; the communication device is further used for: sending identification information of the target household appliance and space occupied by the first resource of the first household appliance to the second household appliance; the determination device is further used for: determining the target household appliance as the control-side household appliance after receiving confirmation response signaling of the target household appliance.

In the technical solution, by determining a target household appliance according to the remaining running space of the second household appliance and the remaining running space of the first household appliance, the target household appliance can replace a communication device such as a router, a switch or a server, so that the hardware layout costs of the Internet of Things are reduced; furthermore, by sending the identification information of the target household appliance and space occupied by a process of the first household appliance to the second household appliance, it can be further determined whether the running capability of the control-side household appliance can support the coordinated control of the Internet of Things, and finally after the confirmation response signaling of the target household appliance is received, the target household appliance is determined to be the control-side household appliance, so that the coordinated running in the Internet of Things can be realized according to control instructions from the control-side household appliance.

Specifically, the first household appliance and at least a second household appliance can be used as the control-side household appliance, therefore, when the control-side household appliance fails in the running control process, since the failed household appliance does not need to report the remaining running space, a new control-side household appliance can be reselected by adopting the above arbitration logic, so that the possibility of the technical problem that the Internet of Things cannot be used due to the failure of the control-side electrical appliance is reduced.

In some embodiments, the remaining running space defined by the technical solution of the present disclosure depends on the running thread of each household appliance.

In any of the above technical solutions, optionally, the remaining running space includes the remaining running space of a memory and/or remaining running space of a CPU.

In the technical solution, because the remaining running space includes the remaining running space of the memory and/or the remaining running space of the CPU, the accuracy of the remaining running space for selecting the control-side household appliance can be increased, and particularly because the remaining running space of the memory and the remaining running space of the CPU are referenced to simultaneously, the determined control-side household appliance can meet the use requirement of CPU resource and the use requirement of memory resource, so that the program execution speed and the system smoothness of the coordinated control process of the Internet of Things are improved.

A CPU utilization rate is the CPU space resource occupied by a running program, indicating the speed for executing the program of the household appliance in a preset time period, a higher CPU utilization rate indicates more programs run by the household appliance in the preset time period, and vice versa. For example, thread (process) A takes 10 ms, then thread (process) B takes 30 ms, and then 60 ms for idle follows; again thread (process) A takes 10 ms, thread (process) B take 30 ms, and then 60 ms for idle follows; and if this happens for a period of time, the occupancy for the period of time is 40%.

In any of the above technical solutions, optionally, the method further includes: the judgment unit is used for determining whether the remaining running space of the memory of any household appliance is greater than a preset threshold value of the remaining running space of the memory; and the determination device is further used for:

determining the household appliance with a largest remaining running space of the memory as the target household appliance when it's determined that the remaining running space of the memory of any household appliance is greater than the preset threshold value of the remaining running space of the memory.

In the technical solution, the household appliance with the largest remaining running space of the memory is determined as the target household appliance when it's determined that the remaining running space of the memory of any household appliance is greater than the preset threshold value of the remaining running space of the memory, and because the running process of each household appliance occupies a large amount of memory space resource in the Internet of Things, a threshold value of the remaining running space of the memory can be set to ensure the running resource requirements of the Internet of Things, for example, the threshold value of the remaining running space of the memory is 1G, 2G, 4G, 8G or 16G, etc.

In any of the above technical solutions, optionally, the determination device is further used for: determining the household appliance with a largest remaining running space of the CPU as the target household appliance when it's determined that the remaining running space of the memory of any household appliance is less than or equal to the preset threshold value of the remaining running space of the memory.

In the technical solution, when it is determined that the remaining running space of the memory of any household appliance is less than or equal to the preset threshold value of the remaining running space of the memory, it's shown that the memory occupancy of the household appliance in the Internet of Things is high; therefore, it's needed to further combine the remaining running space of the CPU to determine the target household appliance.

In any of the above technical solutions, optionally, the communication device is further used for: reporting local hardware running parameters to the control-side household appliance after determining the target household appliance as the control-side household appliance; the communication device is also used for: receiving control instructions fed back by the control-side household appliance in response to the hardware running parameters; and the determination device is further used for: running for a preset period of time according to the control instructions.

In the technical solution, by reporting the local hardware running parameters to the control-side household appliance after determining the target household appliance as the control-side household appliance, the control-side household appliance can determine corresponding control instructions according to the hardware running parameters, where the control-side household appliance is one of the second household appliances.

In some embodiments, the hardware running parameters can be a fan rotating speed, a compressor frequency, an air outlet direction and the like of an air conditioner, and can be a cooking power, a cooking duration, a heat preservation time and the like of a cooking appliance.

In some embodiments, the running control device may be a CPU, an MCU, a DSP, a single-chip microcomputer, an embedded device or the like integrated or compatible with a household appliance, the communication device may include an antenna and an I/O interface, the judgment unit may include a comparator, and the determination device may include an instruction receiving port and electronic control hardware (such as a fan, a heating device, a refrigeration system, an air filter component or the like) of the household appliance.

Figure 2:
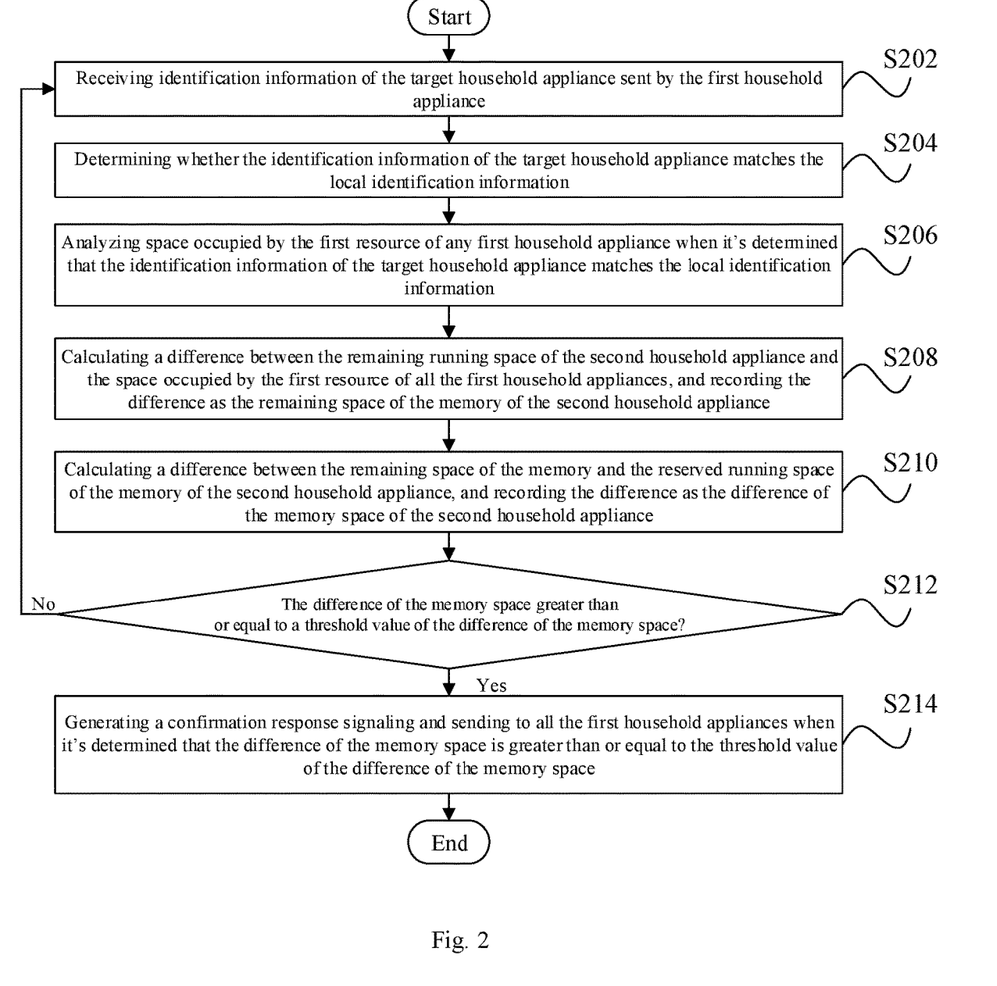
FIG. 2 shows a schematic flowchart of a running control method according to another embodiment of the disclosure.

FIG. 2 shows a schematic flowchart of the running control method according to another embodiment of the disclosure.

As shown in FIG. 2, the running control method according to another embodiment of the disclosure includes: S202, receiving identification information of the target household appliance sent by the first household appliance; S204, determining whether the identification information of the target household appliance matches the local identification information; S206, analyzing space occupied by the first resource of any first household appliance when it's determined that the identification information of the target household appliance matches the local identification information; S208, calculating a difference between the remaining running space of the second household appliance and the space occupied by the first resource of all the first household appliances, and recording the difference as the remaining space of the memory of the second household appliance; S210, calculating a difference between the remaining space of the memory and the reserved running space of the memory of the second household appliance, and recording the difference as the difference of the memory space of the second household appliance; S212, determining whether the difference of the memory space is greater than or equal to a threshold value of the difference of the memory space, if so, implementing S214, and if not, implementing S202; and S214, generating a confirmation response signaling and sending to all the first household appliances when it's determined that the difference of the memory space is greater than or equal to the threshold value of the difference of the memory space.

In the technical solution, by analyzing space occupied by the first resource of any first household appliance when it's determined that the identification information of the target household appliance matches the local identification information, whether the local memory resource can support to control all the second household appliances when playing the role of the control-side household appliance is determined; the confirmation response signaling is generated and sent to all the first household appliances when it's determined that the difference of the memory space is greater than or equal to the threshold value of the difference of the memory space, and a rejection response information is generated and sent to all the first household appliances when it's determined that the difference of the memory space is less than the threshold value of the difference of the memory space, so as to instruct the household appliances in the Internet of Things to reselect the control-side household appliance, where the household appliance sending the rejection response information is excluded from the options for reselection.

In any of the above technical solutions, optionally, the Internet of Things includes at least one of a Bluetooth communication network, a ZigBee communication network, a Wi-Fi communication network, a radio frequency communication network, and a mobile cellular communication network.

According to an embodiment of the disclosure, a resource sharing apparatus of the household appliance is provided, the device includes: a memory, a processor and a resource sharing program of household appliances, where the resource sharing program of the household appliances is stored on the memory and can run on the processor, and the resource sharing program of the household appliances implements the steps of the running control method according to any of the above embodiments when executed by the processor.

In any of the above technical solutions, optionally, the household appliance is one of an electric rice cooker, a soybean milk maker, an electric pressure cooker, an electric kettle, a high speed blender, a refrigerator, an air conditioner, a computer, an audio device, a washing machine and a water heater.

A person skilled in the art can understand that the running control method shown in FIG. 2 has a corresponding running control device, including: a communication device, used for receiving identification information of the target household appliance sent by the first household appliance; a judgment unit, used for determining whether the identification information of the target household appliance matches the local identification information; an analyzing unit, used for analyzing space occupied by the first resource of any first household appliance when it's determined that the identification information of the target household appliance matches the local identification information; a calculating unit, used for calculating a difference between the remaining running space of the second household appliance and the space occupied by the first resource of all the first household appliances and recording the difference as the remaining space of the memory of the second household appliance; the calculating unit is further used for: calculating a difference between the remaining space of the memory and the reserved running space of the memory of the second household appliance, and recording the difference as the difference of the memory space of the second household appliance; the judgment unit is further used for: determining whether the difference of the memory space is greater than or equal to a threshold value of the difference of the memory space, if so, implementing S214, and if not, implementing S202; the communication device is further used for: generating a confirmation response signaling and sending to all the first household appliances when it's determined that the difference of the memory space is greater than or equal to the threshold value of the difference of the memory space.

In the technical solution, by analyzing space occupied by the first resource of any first household appliance when it's determined that the identification information of the target household appliance matches the local identification information, whether the local memory resource can support to control all the second household appliances when playing the role of the control-side household appliance is determined; the confirmation response signaling is generated and sent to all the first household appliances when it's determined that the difference of the memory space is greater than or equal to the threshold value of the difference of the memory space, and a rejection response information is generated and sent to all the first household appliances when it's determined that the difference of the memory space is less than the threshold value of the difference of the memory space, so as to instruct the household appliances in the Internet of Things to reselect the control-side household appliance, where the household appliance sending the rejection response information is excluded from the options for reselection.

In any of the above technical solutions, optionally, the Internet of Things includes at least one of a Bluetooth communication network, a ZigBee communication network, a Wi-Fi communication network, a radio frequency communication network, and a mobile cellular communication network.

In some embodiments, the running control device may be a CPU, an MCU, a DSP, a single-chip microcomputer, an embedded device or the like integrated or compatible with a household appliance, the communication device may include an antenna and an I/O interface, the judgment unit may be a comparator, the analyzing unit may include a decoder, a rectification filtering device, an A/D conversion device or the like, and the calculating unit may include an adder, a subtract or the like.

According to an embodiment of the disclosure, a resource sharing apparatus of the household appliance is provided, the device including: a memory, a processor and a resource sharing program of household appliances, where the resource sharing program of the household appliances is stored on the memory and can run on the processor, and the resource sharing program of the household appliances implements the steps of the running control method according to any of the above embodiments when executed by the processor.

In any of the above technical solutions, optionally, the household appliance is one of an electric rice cooker, a soybean milk maker, an electric pressure cooker, an electric kettle, a high speed blender, a refrigerator, an air conditioner, a computer, an audio device, a washing machine and a water heater.

The running control method according to the disclosure will be described in detail with reference to the following example embodiments.

Figure 3:
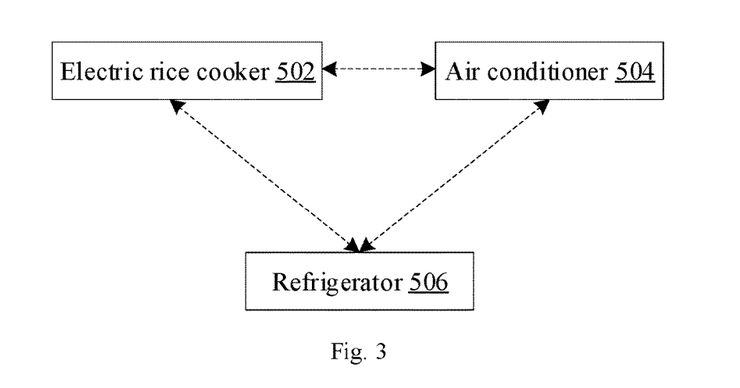
FIG. 3 illustrates an architectural diagram of an Internet of Things according to an embodiment of the disclosure.

As shown in FIG. 3, the Internet of Things includes an electric rice cooker 502, an air conditioner 504 and a refrigerator 506 which are associated and connected, given that the electric rice cooker 502 is taken as the first household appliance and the air conditioner 504 and the refrigerator 506 are taken as the second household appliances, without requiring an additional gateway device in the Internet of Things, so that the hardware layout costs of the Internet of Things are reduced; furthermore, the remaining running spaces of the memory of the air conditioner 504 and the refrigerator 506 received by the electric rice cooker 502 are both 2G, and the remaining running space of the memory of the electric rice cooker 502 is locally obtained to be 800M, hence both the air conditioner 504 and the refrigerator 506 can be determined as the target household appliance; and If the threshold value of the remaining running space of the memory is 4G, furthermore, the remaining running space of the CPU of the air conditioner 504 is 80% and the remaining running space of the CPU of the refrigerator 506 is 30%, the household appliances in the Internet of Things broadcast the identification information of the air conditioner 504 to each other.

In some embodiments, the air conditioner 504 still needs to undergo the following calculation process before generating a confirmation response instruction, including:

(1) calculating a difference between the remaining running space of the air conditioner 504 and spaces occupied by the local process of the electric rice cooker 502 and the refrigerator 506, and recording the difference as the remaining space of the memory of the air conditioner 504;

(2) calculating a difference between the remaining space of the memory and the reserved running space of the memory of the air conditioner 504, and recording the difference as the difference of the memory space of the air conditioner 504;

(3) determining whether the difference of the memory space is greater than or equal to a threshold value of the difference of the memory space;

(4) generating a confirmation response signaling and sending to the electric rice cooker 502 and the refrigerator 506 when it's determined that the difference of the memory space is greater than or equal to the threshold value of the difference of the memory space.

Figure 4:
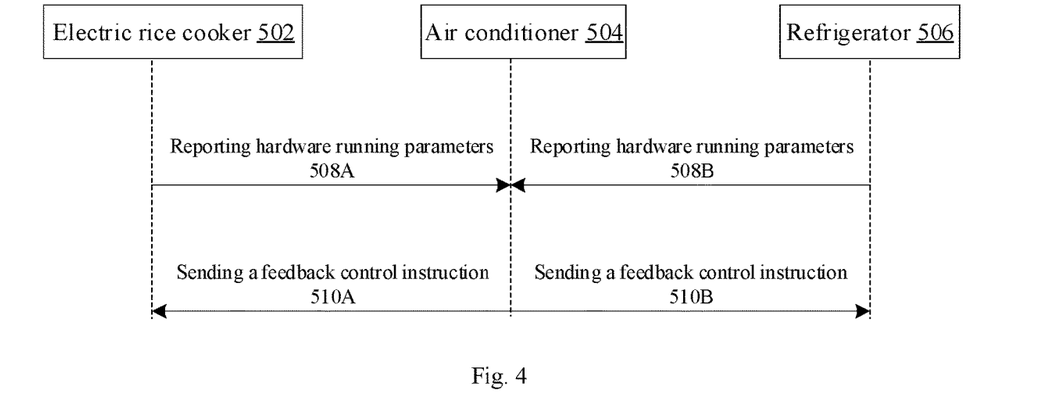
FIG. 4 shows a schematic diagram of a running control solution in the Internet of Things shown in FIG. 3.

As shown in FIG. 4, after receiving the confirmation response instruction from the air conditioner 504, the electric rice cooker 502 and the refrigerator 506 both determine the air conditioner 504 as the control-side household appliance, where the electric rice cooker 502 reports hardware running parameters 508A, such as cooking power and cooking duration, to the air conditioner 504, and receives a feedback control instruction 510B sent by the air conditioner 504, such as "enter a heat preservation state after cooking is completed"; similarly, the refrigerator 506 reports hardware running parameters 508A, such as a compressor running frequency, to the air conditioner 504 and receives a feedback control instruction 510B sent by the air conditioner 504, such as "reduce the compressor running frequency to 10 Hz".

Figure 5:
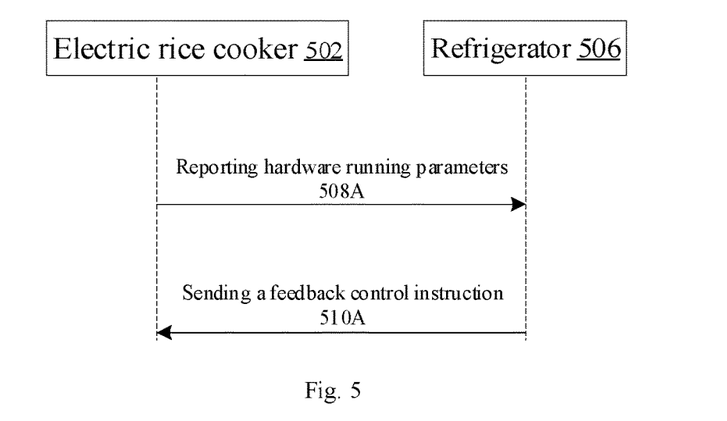
FIG. 5 shows a schematic diagram of another running control solution in the Internet of Things shown in FIG. 3.

As shown in FIG. 5, if the confirmation response instruction is not generated when the air conditioner 504 fails, the electric rice cooker 502 re-determines the refrigerator 506 as the control-side household appliance according to the above logic, where the electric rice cooker 502 reports hardware running parameters 508A, such as cooking power and cooking duration, to the refrigerator 506, and receives the feedback control instruction 510A sent by the refrigerator 506, such as "enter a heat preservation state after cooking is completed," that is, failure of the air conditioner 504 does not affect the coordinated control process of the Internet of Things.

According to an embodiment of the disclosure, a computer-readable storage medium is also provided, the computer-readable storage medium having stored thereon a computer program, and when the computer program is executed, the computer program implements the steps of: receiving the remaining running space sent by the second household appliance; determining the remaining running space of the first household appliance; determining a target household appliance according to the remaining running space of the second household appliance and the remaining running space of the first household appliance; sending the identification information of the target household appliance and the space occupied by a process of the first household appliance to the second household appliance; and determining the target household appliance as the control-side household appliance after receiving confirmation response signaling of the target household appliance.

In the technical solution, by determining a target household appliance according to the remaining running space of the second household appliance and the remaining running space of the first household appliance, the target household appliance can replace a communication device such as a router, a switch or a server, so that the hardware layout costs of the Internet of Things are reduced; furthermore, by sending the identification information of the target household appliance and space occupied by the process of the first household appliance to the second household appliance, it can be further determined whether the running capability of the control-side household appliance can support the coordinated control of the Internet of Things, and finally after the confirmation response signaling of the target household appliance is received, the target household appliance is determined to be the control-side household appliance, so that the coordinated running in the Internet of Things can be realized according to control instructions from the control-side household appliance.

Specifically, the first household appliance and at least a second household appliance can be used as the control-side household appliance, therefore, when the control-side household appliance fails in the running control process, since the failed household appliance does not need to report the remaining running space, a new control-side household appliance can be reselected by adopting the above arbitration logic, so that the possibility of the technical problem that the Internet of Things cannot be used due to the failure of the control-side electrical appliance is reduced.

In some embodiments, the remaining running space defined by the technical solution of the present disclosure depends on the running thread of each household appliance.

In any of the above technical solutions, optionally, the remaining running space includes the remaining running space of a memory and/or remaining running space of a CPU.

In the technical solution, because the remaining running space includes the remaining running space of the memory and/or the remaining running space of the CPU, the accuracy of the remaining running space for selecting the control-side household appliance can be increased, and particularly because the remaining running space of the memory and the remaining running space of the CPU are referenced to simultaneously, the determined control-side household appliance can meet the use requirement of CPU resource and the use requirement of memory resource, so that the program execution speed and the system smoothness of the coordinated control process of the Internet of Things are improved.

A CPU utilization rate is the CPU space resource occupied by a running program, indicating the speed for executing the program of the household appliance in a preset time period, a higher CPU utilization rate indicates more programs run by the household appliance in the preset time period, and vice versa. For example, thread (process) A takes 10 ms, then thread (process) B takes 30 ms, and then 60 ms for idle follows; again thread (process) A takes 10 ms, thread (process) B take 30 ms, and then 60 ms for idle follows; and if this happens for a period of time, the occupancy for the period of time is 40%.

In any of the above technical solutions, optionally, determining a target household appliance according to the remaining running space of the second household appliance and the remaining running space of the first household appliance specifically includes the steps of: determining whether the remaining running space of the memory of any household appliance is greater than a preset threshold value of the remaining running space of the memory; and determining the household appliance with a largest remaining running space of the memory as the target household appliance when it's determined that the remaining running space of the memory of any household appliance is greater than the preset threshold value of the remaining running space of the memory.

In the technical solution, the household appliance with the largest remaining running space of the memory is determined as the target household appliance when it's determined that the remaining running space of the memory of any household appliance is greater than the preset threshold value of the remaining running space of the memory, and because the running process of each household appliance occupies a large amount of memory space resource in the Internet of Things, a threshold value of the remaining running space of the memory can be set to ensure the running resource requirements of the Internet of Things, for example, the threshold value of the remaining running space of the memory is 1G, 2G, 4G, 8G or 16G, etc.

In any of the above technical solutions, optionally, determining a target household appliance according to the remaining running space of the second household appliance and the remaining running space of the first household appliance specifically includes the additional step of: determining the household appliance with a largest remaining running space of the CPU as the target household appliance when it's determined that the remaining running space of the memory of any household appliance is less than or equal to the preset threshold value of the remaining running space of the memory.

In the technical solution, when it is determined that the remaining running space of the memory of any household appliance is less than or equal to the preset threshold value of the remaining running space of the memory, it's shown that the memory occupancy of the household appliance in the Internet of Things is high; therefore, it's needed to further combine the remaining running space of the CPU to determine the target household appliance.

In any of the above technical solutions, optionally, the method further includes: reporting local hardware running parameters to the control-side household appliance after determining the target household appliance as the control-side household appliance; receiving control instructions fed back by the control-side household appliance in response to the hardware running parameters; and running for a preset period of time according to the control instructions.

In the technical solution, by reporting the local hardware running parameters to the control-side household appliance after determining the target household appliance as the control-side household appliance, the control-side household appliance can determine corresponding control instructions according to the hardware running parameters, where the control-side household appliance is one of the second household appliances.

In some embodiments, the hardware running parameters can be a fan rotating speed, a compressor frequency, an air outlet direction and the like of an air conditioner, and can be a cooking power, a cooking duration, a heat preservation time and the like of a cooking appliance.

In any of the above technical solutions, optionally, the method further includes: receiving identification information of the target household appliance sent by the first household appliance; determining whether the identification information of the target household appliance matches the local identification information; analyzing space occupied by the first resource of any first household appliance when it's determined that the identification information of the target household appliance matches the local identification information; calculating a difference between the remaining running space of the second household appliance and the space occupied by the local process of all the first household appliances, and recording the difference as the remaining space of the memory of the second household appliance; calculating a difference between the remaining space of the memory and the reserved running space of the memory of the second household appliance, and recording the difference as the difference of the memory space of the second household appliance; determining whether the difference of the memory space is greater than or equal to a threshold value of the difference of the memory space; and generating a confirmation response signaling and sending to all the first household appliances when it's determined that the difference of the memory space is greater than or equal to the threshold value of the difference of the memory space.

In the technical solution, by analyzing space occupied by the first resource of any first household appliance when it's determined that the identification information of the target household appliance matches the local identification information, whether the local memory resource can support to control all the second household appliances when playing the role of the control-side household appliance is determined; the confirmation response signaling is generated and sent to all the first household appliances when it's determined that the difference of the memory space is greater than or equal to the threshold value of the difference of the memory space, and a rejection response information is generated and sent to all the first household appliances when it's determined that the difference of the memory space is less than the threshold value of the difference of the memory space, so as to instruct the household appliances in the Internet of Things to reselect the control-side household appliance, where the household appliance sending the rejection response information is excluded from the options for reselection.

In any of the above technical solutions, optionally, the Internet of Things includes at least one of a Bluetooth communication network, a ZigBee communication network, a Wi-Fi communication network, a radio frequency communication network, and a mobile cellular communication network.

The technical solutions of the disclosure are described in detail above with reference to the accompanying drawings, and the disclosure provides a running control method, a resource sharing apparatus and a computer-readable storage medium, by determining, from the second household appliance and the first household appliance, the household appliance of which the remaining running space meets a preset remaining running space condition as a control-side household appliance, the control-side household appliance can replace a communication device such as a router, a switch or a server, so that the hardware layout costs of the Internet of Things are reduced.

While the disclosure has been particularly shown and described with reference to embodiments thereof, it will be understood by those skilled in the art that the disclosure is not limited thereto, and various changes may be made to the disclosure. Any modifications, equivalents and variations shall fall within the scope of the disclosure without departing from the spirit of the disclosure.

What is claimed is:

1. A running control method comprising:
   determining a remaining running space of a first household appliance;
   receiving a remaining running space sent by a second household appliance connected with the first household appliance in an Internet of Things; and
   determining one of the second household appliance and the first household appliance that has the remaining running space meeting a preset remaining running space condition as a control-side household appliance.

2. The running control method according to claim 1, further comprising:
   determining a uniform resource locator of a first resource of the first household appliance; and
   receiving a uniform resource locator of a second resource sent by the second household appliance;
   wherein:
   the first resource and the second resource are same; and the remaining running space of the control-side household appliance is configured to access and load the first resource according to the uniform resource locator of the first resource or access and load the second resource according to the uniform resource locator of the second resource.

3. The running control method according to claim 2, wherein:
the first household appliance and the second household appliance are provided with the first resource; and
the control-side household appliance includes a device providing the first resource to other household appliances in the Internet of Things.

4. The running control method according to claim 1, wherein determining one of the second household appliance and the first household appliance as the control-side household appliance includes:
determining, according to the remaining running space of the second household appliance and the remaining running space of the first household appliance, a target household appliance having the remaining running space meeting the preset remaining running space condition;
sending identification information of the target household appliance and a space occupied by a resource of the first household appliance to the second household appliance; and
determining the target household appliance as the control-side household appliance in response to receiving confirmation response signaling of the target household appliance.

5. The running control method according to claim 4, wherein:
the remaining running space of the first household appliance includes at least one of a remaining memory running space of a memory or a remaining CPU running space of a CPU of the first household appliance; and
the remaining running space of the second household appliance includes at least one of a remaining memory running space of a memory or a remaining CPU running space of a CPU of the second household appliance.

6. The running control method according to claim 5, wherein determining the target household appliance according to the remaining running space of the second household appliance and the remaining running space of the first household appliance includes:
determining whether the remaining memory running space of each of the first household appliance and the second household appliance is greater than a preset threshold; and
in response to determining that the remaining memory running space of each of the first household appliance and the second household appliance is greater than the preset threshold, determining one of the first household appliance and the second household appliance that has a largest remaining memory running space as the target household appliance.

7. The running control method according to claim 5, wherein determining the target household appliance according to the remaining running space of the second household appliance and the remaining running space of the first household appliance includes:
determining whether the remaining memory running space of each of the first household appliance and the second household appliance is greater than a preset threshold; and
in response to determining that the remaining memory running space of each of the first household appliance and the second household appliance is smaller than or equal to the preset threshold, determining one of the first household appliance and the second household appliance that has a largest remaining CPU running space as the target household appliance.

8. The running control method according to claim 1, wherein the Internet of Things includes at least one of a Bluetooth communication network, a ZigBee communication network, a Wi-Fi communication network, a radio frequency communication network, or a mobile cellular communication network.

9. A resource sharing apparatus comprising:
a processor; and
a memory storing a program that, when executed by the processor, causes the processor to perform the running control method according to claim 1.

10. A computer-readable storage medium storing a computer program that, when executed by a processor, causes the processor to perform the running control method according to claim 1.

11. A running control method comprising:
receiving target household appliance identification information sent by a first household appliance;
determining whether the target household appliance identification information matches local identification information stored in a second household appliance connected with the first household appliance in an Internet of Things;
analyzing a space occupied by a resource of the first household appliance in response to determining that the target household appliance identification information matches the local identification information;
calculating a difference between a remaining running space of the second household appliance and the space occupied by the resource of the first household appliance, and recording the difference as a remaining memory space of a memory of the second household appliance;
calculating a difference between the remaining memory space and a reserved memory running space of the second household appliance, and recording the difference as a memory space difference of the second household appliance;
determining whether the memory space difference is greater than or equal to a threshold; and
in response to the memory space difference being greater than or equal to the threshold, generating a confirmation response signaling and sending the confirmation response signaling to the first household appliance.

12. The running control method according to claim 11, wherein the Internet of Things includes at least one of a Bluetooth communication network, a ZigBee communication network, a Wi-Fi communication network, a radio frequency communication network, or a mobile cellular communication network.

13. The resource sharing apparatus according to claim 12, wherein each of the first household appliance and the second household appliance includes one of an electric rice cooker, a soybean milk maker, an electric pressure cooker, an electric kettle, a high speed blender, a refrigerator, an air conditioner, a computer, an audio device, a washing machine, and a water heater.

14. A resource sharing apparatus comprising:
- a processor; and
- a memory storing a program that, when executed by the processor, causes the processor to perform the running control method according to claim 11.

15. The resource sharing apparatus according to claim 14, wherein each of the first household appliance and the second household appliance includes one of an electric rice cooker, a soybean milk maker, an electric pressure cooker, an electric kettle, a high speed blender, a refrigerator, an air conditioner, a computer, an audio device, a washing machine, and a water heater.

16. A computer-readable storage medium storing a computer program that, when executed by a processor, causes the processor to perform the running control method according to claim 11.

* * * * *